Aug. 27, 1946.  A. W. OEHLER ET AL  2,406,706
HARVESTER REEL
Filed June 22, 1944  2 Sheets-Sheet 1
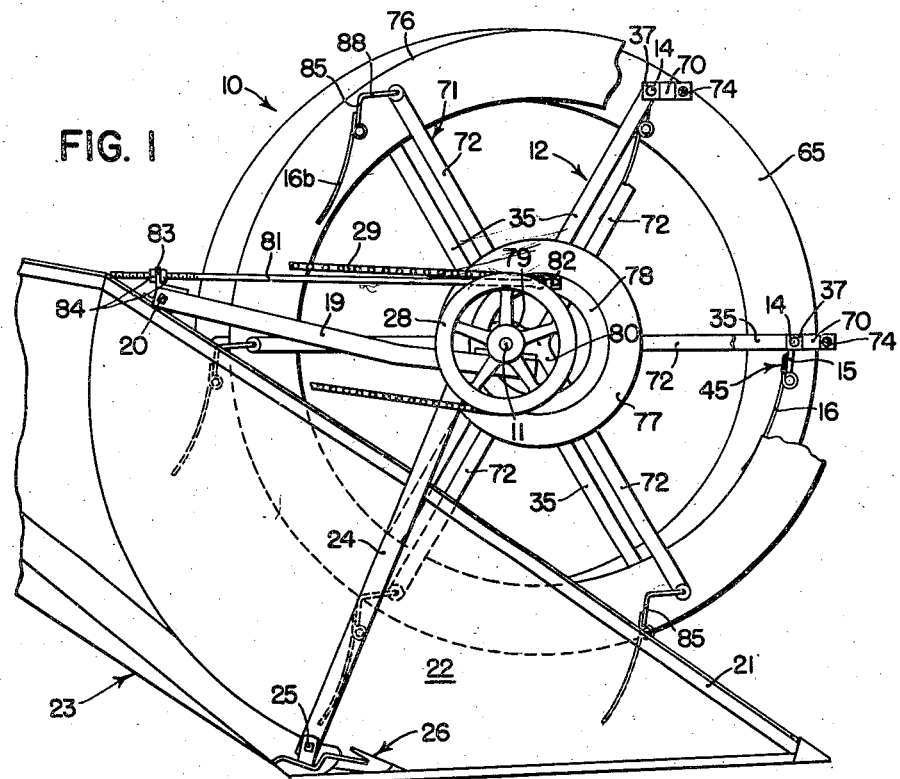
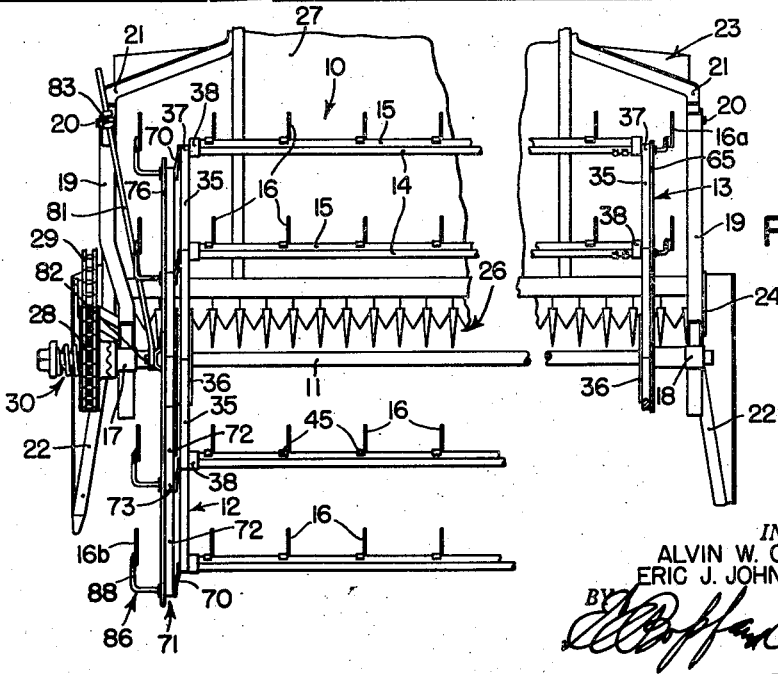
INVENTORS
ALVIN W. OEHLER
ERIC J. JOHNSON
ATTORNEYS

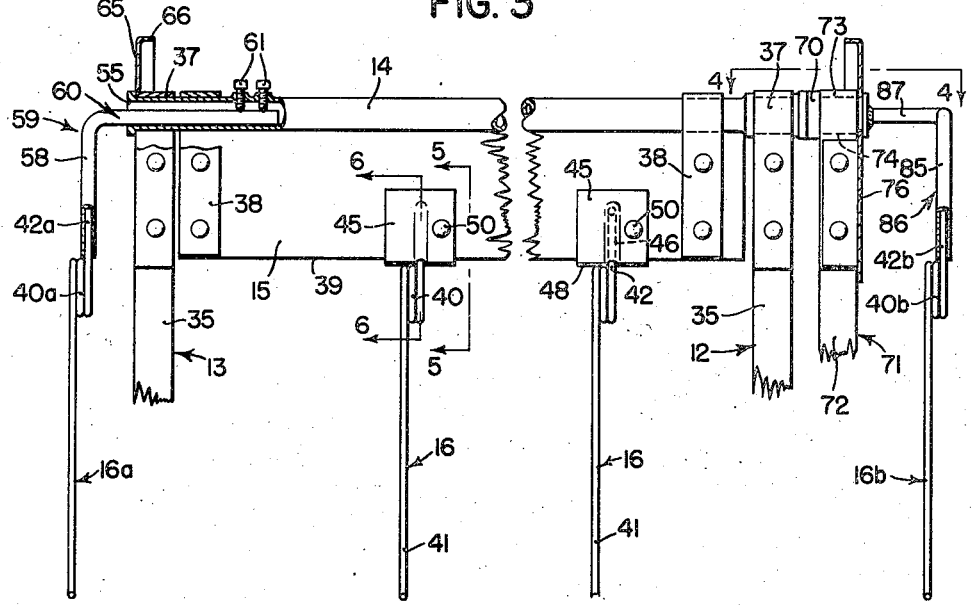

Patented Aug. 27, 1946

2,406,706

UNITED STATES PATENT OFFICE 2,406,706

HARVESTER REEL

Alvin W. Oehler and Eric J. Johnson, Moline, Ill., assignors to Deere & Company, Moline, Ill., a corporation of Illinois Application June 22, 1944, Serial No. 541,573

13 Claims. (Cl. 56—226)

The present invention relates generally to harvester reels and more particularly to reels having crop engaging members which maintain a predetermined angular relation to the ground as they move into engagement with the crops, sometimes called "feathering" reels. The principal object of the invention relates to the provision of a novel and improved reel which is more efficient in operation but without a proportionate increase in complexity and cost of manufacture.

Another object relates to the provision of a feathering type reel which has crop engaging members over the entire width of the reel. Heretofore, reels of this type required an appreciable space between the end of the reel bats and the side wall of the harvester platform to accommodate the feathering mechanism. This space without crop engageable members to gather the grain, resulted in the loss of some of the harvested crop and also resulted in crop material becoming entangled with the reel feathering mechanism. A more specific object of the invention, therefore, relates to the provision of extra crop engageable fingers supported outwardly of the feathering mechanism and in transverse alignment with the other fingers in each row and shiftable therewith during each revolution of the reel. This object is accomplished according to the principles of this invention by mounting finger supporting arms on the bat supporting shafts and extending outwardly of the feathering mechanism in such a manner that the latter is not interfered with during operation. The extra fingers engage any crops that fall between the ends of the reel bats and the side wall of the platform, thereby clearing the crops out of this space and preventing them from accumulating and fouling the feathering mechanism.

Another object relates to the provision of extra fingers at the other end of the reel outside the reel spider, which can be adjusted laterally between the spider and the adjacent side wall of the platform to insure that the crops in that region are efficiently conveyed to the platform.

Still another object relates to the provision of a novel and improved means for mounting the fingers on the reel bats, and that is simpler and cheaper to manufacture without sacrifice in durability. A related object has to do with the provision of a novel mounting clip for mounting spring fingers on wood bats and support the fingers in such a manner as to restrict excessive vibration of the latter.

These and other objects and advantages of my invention will be apparent to those skilled in the art after a consideration of the following description in which reference is had to the drawings appended hereto, in which Figure 1 is a side elevation of a harvester platform and reel, a portion of the latter being broken away to show details of construction;

Figure 2 is a plan view, also broken away in parts;

Figure 3 is an enlarged front elevation of the end portions of one of the reel bats showing the mounting means and extra fingers, the middle of the bat being broken away;

Figure 4 is a fragmentary plan view taken along a line 4—4 in Figure 3;

Figure 5 is an enlarged side elevation showing one of the finger mounting devices, taken along a line 5—5 in Figure 3; and Figure 6 is an enlarged sectional elevational view taken along a line 6—6 in Figure 3.

Referring now to the drawings, the harvester reel is indicated in its entirety by reference numeral 10 and includes generally a main supporting axle or shaft 11, on which is rigidly mounted a pair of laterally spaced spiders 12, 13, carrying a plurality of bat supporting shafts 14, on each of which is mounted a wooden bat 15 and a row of crop engageable fingers 16 fixed to the edge of each bat. The axle 11 is journaled in a pair of bearings 17, 18, mounted on a pair of fore and aft extending supporting arms 19, which are secured at their rear ends by bolts 20 to the top members 21 of the side walls 22 of a harvester platform, indicated by reference numeral 23. The forward ends of the supporting arms 19 are carried on legs 24 secured by bolts 25 to the platform. A cutter bar 26 extends transversely across the platform 23 beneath the reel 10 and severs the crops from the field while the reel 10 rotates in a clockwise direction as viewed in Figure 1 to lay the harvester crops rearwardly upon the platform conveyor 27 in well-known manner. The reel axle 11 is driven by a sprocket 28 over which a drive chain 29 is trained to transmit power from any suitable source (not shown). The sprocket 28 is journaled on the axle 11 and is connected therewith through a slip clutch 30 of conventional design.

Each of the spiders 12, 13 comprise a plurality of spokes 35, fixedly secured to the axle 11 by suitable mounting plates 36 and extending generally radially therefrom. The bat supporting shafts 14 are each journaled at opposite ends, respectively, in a pair of bearings 37 mounted on corresponding spokes 35 of the spiders 12, 13. Each shaft 14 carries a bat 15, which is rigidly fixed along one edge to the shaft by securing straps 38.

A row of crop engageable spring fingers 16 is secured to the opposite edge 39 of each bat. Each finger 16 comprises a helical coil 40 formed of two turns of spring wire, a tine 41 extending tangentially from one end of the coil 40, and a supporting shank 42 extending in the opposite direction from the other end of the coil 40. The end 43 of the shank 42 is bent at right angles to the shank and is received within a hole 44 in the bat 15. The shank 42 extends over the edge 39 of the bat and lies against the side of the bat with the coil 40 disposed adjacent the edge 39 of the bat and the tine 41 extending outwardly therefrom, all of the tines in the row lying in transverse alignment.

A securing clip 45 lies over each supporting shank 42 and comprises a small plate preferably formed of sheet metal with the center portion pressed or otherwise deformed to form a groove 46 on the inner side of the plate to receive the shank 42, the surrounding portions of the plate being flat against the bat. The lower edge of the plate 45 is turned under the edge 39 of the bat to form a flange 47, which is slotted to straddle the shank 42. A reenforcing strip 48, also preferably of sheet metal, lies along the lower surface of the flange 46 and is rigidly fixed thereto, as by welding. The reenforcing strip 48 passes under the shank 42 and serves as a support or brace for the latter.

The clip 45 is perforated at 49 to receive a fastening bolt 50, which is inserted through an aligned aperture 51 in the bat 15 offset from the hole 44, and the bolt is secured by a nut 52, threaded on the end of the bolt on the opposite side of the bat 15, over a washer 53.

As the reel rotates in a clockwise direction during operation, as viewed in Figure 1, the forces affecting the fingers due to engagement with crop material tend to force the shank 42 against the reenforcing strip 48 and against the surface of the groove 46. Thus, the strip 48 provides a durable fulcrum for the finger. Without the strip 48 the shank would press or wear a notch in the edge of the bat. The groove 46 also prevents lateral displacement of the finger, while the turned end 43 prevents the finger from shifting longitudinally of the groove. The entire finger and clip assembly can easily be removed by removing one bolt 50.

Each shaft 14 comprises a hollow tube, one end 55 of which is open beyond the spider bearing 37. Due to variations in the widths of harvester platforms and to the inaccuracies in mounting the supporting arms 19, 20, there is sometimes an appreciable space between the end of the reel and the platform wall 22 in which the crops are not subject to positive action by the reel. According to this invention, this condition is remedied by providing an extra finger 16a outwardly of the spider 13, for the purpose of positively engaging and moving any crops in this space. The finger 16a is rigidly fixed to one arm 58 of an L-shaped member 59, preferably by welding the shank 42a thereto. The other arm 60 of the member 59 extends axially in telescoping relation to the shaft 14 and serves as an extension of the latter beyond the spider 13. The member can be adjusted axially of the shaft 14 to obtain the desired clearance between the finger 16a and the side wall 22 of the platform by shifting the arm 60 in or out of the end 55 of the shaft 14, and can also be rotated to swing the finger 16a into any desired angular relation with the row of fingers 16 on the bat 15. Preferably, the finger 16a is adjusted to a position in transverse alignment with the others in the row. The finger 16a is fixed to the shaft 14 in laterally and angularly adjusted position by tightening a pair of set screws 61, which are mounted in suitable threaded apertures in the shaft 14. Thus, the arms 58 lie in the planes of the associated bats 15 and swing therewith relative to the spider 13.

The outer ends of the spokes 35 in the spider 13 are interconnected by an annular shield 65, preferably formed of sheet metal with an inwardly turned stiffening flange 66. The shield braces the arms 35 and prevents crops from catching on the ends thereof.

On the opposite end of each shaft 14 is fixed an actuating arm 70 outwardly of the spider 12, and disposed at an angle to the plane of the bat 15. A control spider 71 is disposed laterally outwardly of the spider 12 and comprises a plurality of spokes 72, the outer ends of which carry journal sleeves 73, which embrace bearings 74 rigidly fixed by bolts 75 to the outer ends of the arms 70, respectively. The spokes 72 are interconnected at their outer ends by an annular shield 76 and the inner ends are interconnected by an annular member 77. The inner ends of the spokes 72 bear on the outer surface of a camming cylinder 78, which is mounted on a hub 79 journaled on the reel axle 11. The hub 79 is fixed eccentrically of the camming cylinder 78 and is braced by spokes 80. The cylinder 78 is normally held stationary by a brace rod 81, bolted at 82 to the cylinder 78 and extending rearwardly through an apertured bracket 83 fixed to the supporting arm 19. The rod 81 is threaded to receive a pair of adjusting nuts 84 on opposite sides of the bracket 83 to adjust the rod fore and aft to swing the cylinder 78 about its eccentric axis, thereby shifting the axis of the control spider 71 relative to the axis of the axle 11. This causes the arms 70 to shift angularly relative to the spider 12, thereby rocking the shafts 14 and bats 15 to adjust the fingers 16 to various angles of approach to the harvested crops, as is well-known to those skilled in the art.

Heretofore, the crops in the space occupied by the spiders 12 and 71, between the end fingers 16 on the bats and the side wall 22 of the platform 23 have received no positive action by the reel. According to the present invention, however, this portion of the crop is acted upon by a plurality of extra fingers 16b disposed between the control spider 71 and the adjacent side wall 22. Each finger shank 42b is welded to one end 85 of an arm 86 which has a supporting end 87 fixed to the end of the bearing 74 and extending axially outwardly therefrom. The arm 86 is bent to form a radially extending portion 88 lying substantially in the plane of the control arm 70, and the end 85 is carried at the outer end of the portion 88 and lies substantially in the plane of the associated bat 15. Thus, since the arm 86 is rigid with the bearing 74, arm 70, shaft 14, and bat 15, the finger 16b is carried in transverse alignment with the row of fingers 16 on the bat and swings angularly therewith. Inasmuch as the arms 86 are solely supported on the ends of the bearings 74, there is, of course, no interference between the fingers 16b and the feathering mechanism during operation.

We claim:

1. In a harvester reel comprising a supporting axle, a pair of laterally spaced spiders mounted thereon, a plurality of circumferentially spaced shafts rockably mounted between said spiders, bats fixed to said shafts, respectively, and rockable therewith, and laterally spaced crop engageable fingers fixed to each of said bats, the combination of means serving as extensions of said shafts outwardly of at least one of said spiders and shiftable axially relative to said shafts, means securing said extension means to said shafts in axially adjusted position, an arm mounted on each of said extension means and extending radially of the axis of the associated shaft substantially in the plane of the associated bat, and a crop engageable finger fixed to said arm and disposed in transverse alignment with said fingers on said associated bat.

2. In a harvester reel comprising a supporting axle, a pair of laterally spaced spiders mounted thereon, a plurality of circumferentially spaced hollow shafts rockably mounted between said spiders, bats fixed to said shafts, respectively, and rockable therewith, and laterally spaced crop engageable fingers fixed to each of said bats, the combination of a plurality of L-shaped members each having one arm thereof adapted to extend into the end of one of said hollow shafts and a second arm extending generally radially from the axis of the shaft outwardly of the adjacent spider, a crop engageable finger mounted on said radial arm and means for fixing said arms within said shafts to position said last mentioned finger in transverse alignment with said fingers on the bat associated therewith.

3. In a harvester reel comprising a supporting axle, a pair of laterally spaced spiders mounted thereon, a plurality of circumferentially spaced hollow shafts rockably mounted between said spiders, bats fixed to said shafts, respectively, and rockable therewith, and laterally spaced crop engageable fingers fixed to each of said bats, the combination of a plurality of L-shaped members each having one arm thereof adapted to extend into the end of one of said hollow shafts and a second arm extending generally radially from the axis of the shaft outwardly of the adjacent spider, a crop engageable finger mounted on said radial arm, said members being shiftable toward and away from the ends of said shafts to adjust the lateral spacing of said outer fingers relative thereto, and means for fixing said one arm of each member in its respective shaft in adjusted position.

4. In a harvester reel comprising a supporting axle, a pair of laterally spaced spiders mounted thereon, a plurality of circumferentially spaced shafts rockably mounted between said spiders, a row of laterally spaced crop engageable fingers fixed to each of said shafts, and mechanism interconnecting said shafts outwardly of one of said spiders for controlling the angular position of said fingers during rotation of said reel, including a control spider supported for rotation about an axis eccentric of said reel axle, the combination of an extra finger for each row of fingers disposed outwardly of said control mechanism, and means for supporting each of said extra fingers on its respective shaft providing for maintaining said extra finger in a predetermined angular relation to the other fingers of the row.

5. In a harvester reel comprising a supporting axle, a pair of laterally spaced spiders mounted thereon, a plurality of circumferentially spaced shafts rockably mounted between said spiders, a row of laterally spaced crop engageable fingers fixed to each of said shafts, control arms fixed to said shafts outwardly of one of said spiders, and a control spider rotatably mounted on an axis eccentric of said axle and coupled to the outer ends of said arms for controlling the angular position of said fingers during rotation of said reel, the combination of an extra finger for each row of fingers disposed outwardly of said control spider, and a supporting arm for each of said fingers, said supporting arms being mounted on said control arms, respectively, and swingable angularly therewith relative to said spider.

6. In a harvester reel comprising a supporting axle, a pair of laterally spaced spiders mounted thereon, a plurality of circumferentially spaced shafts rockably mounted between said spiders, a row of laterally spaced crop engageable fingers fixed to each of said shafts, crank arms fixed to said shafts outwardly of one of said spiders, and a control spider rotatable about an axis eccentric of said axle and journaled on each of said crank arms for controlling the angular position of said fingers during rotation of said reel, the combination of an extra finger for each row of fingers, and means for supporting said extra fingers on said crank arms, respectively, outwardly of said control spider and coaxially with the journal connections of the latter to said arms, to provide for engaging harvested crops at the end of said reel.

7. In a harvester reel comprising a supporting axle, a pair of laterally spaced spiders mounted thereon, a plurality of circumferentially spaced shafts rockably mounted between said spiders, a row of laterally spaced crop engageable fingers fixed to each of said shafts, control arms fixed to said shafts, respectively, outwardly of one of said spiders, crank pins fixed to the outer ends of said control arms, control rods journaled on said pins and extending inwardly toward said axle and cam means adjacent the inner ends of said rods for controlling the angular positions of said control arms and hence the angular positions of the fingers associated therewith, the combination of a plurality of finger supporting arms fixed to the outer ends of said crank pins, respectively, and swingable with said control arms, and crop engageable fingers mounted on said supporting arms, respectively, outwardly of said rods and extending in a fixed angular relation to the fingers associated with said control arms.

8. In a harvester reel comprising a supporting axle, a pair of laterally spaced spiders mounted thereon, a plurality of circumferentially spaced shafts rockably mounted between said spiders, bats fixed to said shafts, respectively, and rockable therewith, a row of laterally spaced crop engageable fingers fixed to each of said bats, control arms fixed to said shafts, respectively, outwardly of one of said spiders and disposed in a certain angular relation to said bats, crank pins fixed to the outer ends of said control arms, control rods journaled on said pins and extending inwardly toward said axle, and cam means adjacent the inner ends of said rods for controlling the angular positions of said control arms and hence the angular positions of the bats and fingers associated therewith, the combination of a plurality of finger supporting arms fixed to the outer ends of said cranks pins and swingable with said control arms, said supporting arms extending through the projected axes of said shafts, respectively, and having end portions lying substantially in the projected planes of said bats, respectively, and crop engageable fingers mounted on said end portions and extending outwardly in transverse alignment with the respective rows of fingers to engage harvested crops outwardly of said control rods.

9. The combination set forth in claim 8, including the further provision of means rigidly interconnecting the ends of said control rods comprising an annular shield disposed in a generally vertical plane.

10. In a harvester reel comprising a supporting axle, a pair of laterally spaced spiders mounted thereon, a plurality of circumferentially spaced shafts rockably mounted between said spiders, a row of laterally spaced crop engageable fingers fixed to each of said shafts, control arms fixed to said shafts respectively, outwardly of one of said spiders, crank pins fixed to the outer ends of said control arms, control rods journalled on said pins and extending inwardly toward said axle, an annular member rigidly interconnecting the inner ends of said control rods, peripheral shield means rigidly interconnecting the outer ends of said rods to form a unitary control spider and to prevent crops from entangling the ends of said rods, and cam means adjacent the inner ends of said rods for controlling the angular positions of said control arms and hence the angular positions of the fingers associated therewith, the combination of a plurality of finger supporting arms fixed to the outer ends of said crank pins, respectively, and swingable with said control arms, and crop engageable fingers mounted on said supporting arms, respectively, outwardly of said rods and extending in a fixed angular relation to the fingers associated with said control arms.

11. In a harvester reel comprising a supporting axle, a pair of laterally spaced spiders mounted thereon, each spider including a hub and a plurality of arms extending radially therefrom, a plurality of circumferentially spaced shafts rockably mounted between arms on said spiders, bats fixed to said shafts, respectively, and rockable therewith, mechanism connected with said shafts outwardly of one of said spiders for controlling the angular positions of said bats during rotation of said reel, and a peripherally extending shield interconnecting the outer ends of said arms of the other of said spiders outwardly of said bats to prevent crops from entangling the ends of the latter, and an extra finger for each row of fingers disposed outwardly of said shield, and means for supporting each of said extra fingers on its respective shaft providing for maintaining said extra finger in a predetermined angular relation to the other fingers of the row.

12. In a harvester reel comprising a supporting axle, a pair of laterally spaced spiders mounted thereon, each spider including a hub and a plurality of arms extending radially therefrom, a plurality of circumferentially spaced hollow shafts rockably mounted between arms on said spiders, bats fixed to said shafts, respectively, and rockable therewith, mechanism connected with said shafts for controlling the angular positions of said bats during rotation of said reel, a peripherally extending vertical shield interconnecting the outer ends of said arms of one of said spiders outwardly of said bats to prevent crops from entangling the ends of the latter, and a plurality of L-shaped members each having one arm thereof adapted to extend into the end of one of said hollow shafts and a second arm extending generally radially from the axis of said shaft outwardly of said shield, a crop engageable finger mounted on said radial arm, said members being shiftable toward and away from the ends of said shafts to adjust the lateral spacing of said outer fingers relative thereto, and means for fixing said one arm of each member in its respective shaft in adjusted position.

13. In a harvester reel comprising a supporting axle, a pair of laterally spaced spiders mounted thereon, a plurality of circumferentially spaced shafts rockably mounted between said spiders, a row of laterally spaced crop engageable fingers fixed to each of said shafts, crank arms fixed to said shafts outwardly of one of said spiders, a control spider rotatable about an axis eccentric of said axle and journaled on each of said crank arms for controlling the angular positions of said fingers during rotation of said reel, said control spider including a peripherally extending shield for preventing crops from entangling said crank arms, an extra finger for each row of fingers, and means for supporting said extra fingers on said crank arms, respectively, outwardly of said shield and coaxially with the journal connections of said control spider to said arms, to provide for engaging harvested crops at the end of said reel.

ALVIN W. OEHLER.
ERIC J. JOHNSON.